(12) United States Patent
Minagawa et al.

(10) Patent No.: US 12,535,268 B2
(45) Date of Patent: Jan. 27, 2026

(54) FUEL CELL POWER-SUPPLY MANAGEMENT DEVICE AND FUEL CELL POWER-SUPPLY MANAGEMENT METHOD

(71) Applicant: HONDA MOTOR CO., LTD., Tokyo (JP)

(72) Inventors: Tatsuya Minagawa, Tokyo (JP); Naoki Yamano, Wako (JP); Akihisa Sato, Tokyo (JP); Ayato Ito, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 322 days.

(21) Appl. No.: 18/553,859

(22) PCT Filed: Dec. 28, 2021

(86) PCT No.: PCT/JP2021/048996
§ 371 (c)(1),
(2) Date: Oct. 4, 2023

(87) PCT Pub. No.: WO2022/215306
PCT Pub. Date: Oct. 13, 2022

(65) Prior Publication Data
US 2024/0183608 A1 Jun. 6, 2024

(30) Foreign Application Priority Data
Apr. 9, 2021 (JP) .................. 2021-066273

(51) Int. Cl.
*F25J 1/02* (2006.01)
*F25J 1/00* (2006.01)

(52) U.S. Cl.
CPC ............. *F25J 1/0275* (2013.01); *F25J 1/001* (2013.01); *F25J 1/0252* (2013.01); *F25J 2210/90* (2013.01)

(58) Field of Classification Search
CPC ........ F17C 2221/012; F17C 2223/0161; F17C 2223/033; F17C 2223/043;
(Continued)

(56) References Cited

U.S. PATENT DOCUMENTS

| 10,384,926 B1 * | 8/2019 | Kaufman | ............... F25J 1/0236 |
| 10,677,523 B2 * | 6/2020 | Decker | ................... F25J 1/0254 |

(Continued)

FOREIGN PATENT DOCUMENTS

| CN | 108397975 A | 8/2018 |
| CN | 108799823 A | 11/2018 |

(Continued)

OTHER PUBLICATIONS

English translation of the International Preliminary Report on Patentability issued Oct. 10, 2023 in the corresponding International application No. PCT/JP2021/048996 (5 pages).

(Continued)

*Primary Examiner* — Filip Zec
(74) *Attorney, Agent, or Firm* — Rankin, Hill & Clark LLP

(57) ABSTRACT

A fuel cell power-supply management device and a fuel cell power-supply management method enabling efficient recovery and utilization of boil-off gas. The fuel cell power-supply management device includes: a boil-off gas accumulation amount recognition unit that recognizes an accumulation amount of the boil-off gas in a boil-off gas accumulation unit; a demand status recognition unit that recognizes a demand status for each use of the boil-off gas; a boil-off gas recovery timing determination unit that determines a recovery timing of the boil-off gas accumulated in the boil-off gas accumulation unit, based on an accumulation amount of the boil-off gas recognized by the boil-off gas accumulation amount recognition unit or a demand status of the boil-off (Continued)

gas recognized by the demand status recognition unit; and a boil-off gas utilization processing arrangement unit that arranges utilization processing of the boil-off gas recovered from the boil-off gas accumulation unit at the recovery timing.

9 Claims, 4 Drawing Sheets

(58) Field of Classification Search
CPC ............ F17C 2265/032; F17C 2265/06; F17C 2270/01; F17C 9/04; F25J 1/001; F25J 1/0252; F25J 1/0275; F25J 2210/90
See application file for complete search history.

(56) References Cited

U.S. PATENT DOCUMENTS

| | | | |
|---|---|---|---|
| 10,816,262 B2* | 10/2020 | Watanabe | F25J 1/0067 |
| 11,193,696 B2* | 12/2021 | Holladay | H10N 15/20 |
| 11,680,746 B2* | 6/2023 | Allidieres | F17C 1/12 62/607 |
| 2014/0079593 A1* | 3/2014 | Naito | B01J 19/0046 422/111 |
| 2015/0068246 A1 | 3/2015 | Hakamade et al. | |
| 2017/0321332 A1* | 11/2017 | Gupta | C25B 1/04 |
| 2018/0347897 A1* | 12/2018 | Cardella | F25J 1/0067 |
| 2019/0112008 A1* | 4/2019 | Shin | B63J 2/14 |
| 2019/0137171 A1* | 5/2019 | Barclay | F25J 1/0225 |

FOREIGN PATENT DOCUMENTS

| | | |
|---|---|---|
| CN | 109599576 A | 4/2019 |
| DE | 10 2019 000 519 A1 | 7/2020 |
| EP | 3 358 285 A1 | 8/2018 |
| JP | 2002-106791 A | 4/2002 |
| JP | 2002-213697 A | 7/2002 |
| JP | 2004-327404 A | 11/2004 |
| JP | 2011-80490 A | 4/2011 |
| JP | 2013-242113 A | 12/2013 |
| JP | 2018-128038 A | 8/2018 |

OTHER PUBLICATIONS

Chinese Office Action dated Apr. 16, 2025 issued in corresponding Chinese application No. 202180096436.3; partial English machine translation included (17 pages).
International Search Report dated Feb. 15, 2022, Application No. PCT/JP2021/048996; English translation included, 4 pages.
Written Opinion of the International Searching Authority dated Feb. 15, 2022, PCT/JP2021/048996; 3 pages.

* cited by examiner

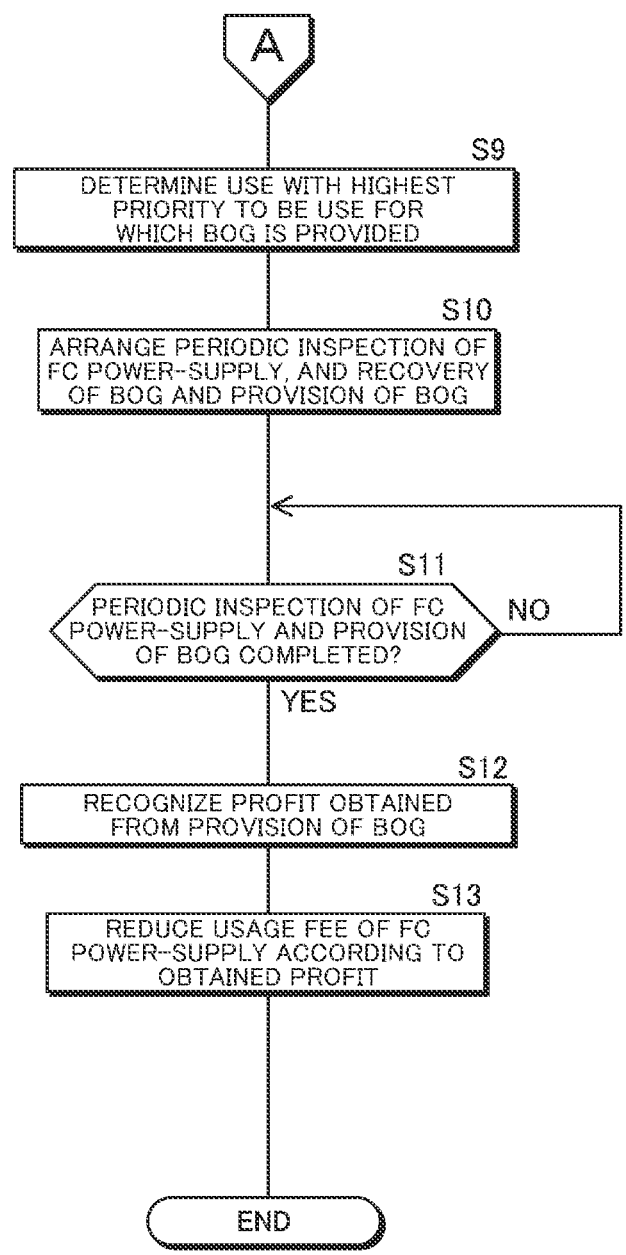

FUEL CELL POWER-SUPPLY MANAGEMENT DEVICE AND FUEL CELL POWER-SUPPLY MANAGEMENT METHOD

TECHNICAL FIELD

The present invention relates to a fuel cell power-supply management device and a fuel cell power-supply management method.

BACKGROUND ART

Conventionally, there has been proposed a liquid hydrogen production device that re-liquefies boil-off gas (BOG) generated in a liquid hydrogen tank and re-uses it as liquid hydrogen (see, for example, Patent Literature 1). In addition, a boil-off gas recovery system has been proposed in which boil-off gas generated in a liquefied natural gas storage tank is compressed to separate oil, is then supplied to engines, generators, etc. to be used, and is returned to storage tanks (for example, see Patent Literature 2).

CITATION LIST

Patent Literature

[Patent Literature 1]
   Japanese Patent Laid-Open No. 2013-242113
[Patent Literature 2]
   Japanese Patent Laid-Open No. 2018-128038

SUMMARY OF INVENTION

Technical Problem

Devices that use liquid hydrogen include fuel cell power-supplies, and fuel cell power-supplies are deployed in data centers, etc., as backup power-supplies in preparation for power outages, for example. The fuel cell power-supplies, as described above, may also recover and utilize the boil-off gas generated in the liquefied hydrogen tanks, and desirably recover boil-off gas efficiently.

The present invention has been made in view of this background, and an object of the present invention is to provide a fuel cell power-supply management device and a fuel cell power-supply management method capable of efficiently recovering and utilizing boil-off gas.

Solution to Problem

This description includes all the contents of Japanese Patent Application No. 2021-066273 filed on Apr. 9, 2021.

A first aspect for achieving the object is a fuel cell power-supply management device that manages a fuel cell power-supply having a liquid hydrogen tank and a boil-off gas accumulation unit for accumulating boil-off gas generated in the liquid hydrogen tank, the fuel cell power-supply management device including: a boil-off gas accumulation amount recognition unit that recognizes an accumulation amount of boil-off gas in the boil-off gas accumulation unit; a demand status recognition unit that recognizes a demand status for each use of the boil-off gas; a boil-off gas recovery timing determination unit that determines a recovery timing of the boil-off gas accumulated in the boil-off gas accumulation unit, based on an accumulation amount of the boil-off gas or a demand status of the boil-off gas, the accumulation amount being recognized by the boil-off gas accumulation amount recognition unit, the demand status being recognized by the demand status recognition unit; and a boil-off gas utilization processing arrangement unit that arranges utilization processing of the boil-off gas recovered from the boil-off gas accumulation unit at the recovery timing.

The fuel cell power-supply management device may include a periodic inspection arrangement unit that arranges periodic inspection of the fuel cell power-supply in synchronization with the recovery timing, wherein the boil-off gas utilization processing arrangement unit arranges, as the utilization processing, the periodic inspection in which the power generated by utilizing boil-off gas recovered from the boil-off gas accumulation unit is used.

The fuel cell power-supply management device may include: a weather information acquisition unit that acquires weather information for an area where the fuel cell power-supply is installed; a power outage occurrence probability estimation unit that estimates power outage occurrence probability in the area for a predetermined period ahead based on the weather information; and a boil-off gas recovery condition change unit that relaxes a condition for determining the recovery timing when the power outage occurrence probability is lower than a predetermined value, relative to when the power outage occurrence probability is equal to or higher than the predetermined value, the condition being determined by the boil-off gas recovery timing determination unit for the predetermined period.

The fuel cell power-supply management device may be configured so that the boil-off gas recovery condition change unit prohibits the boil-off gas recovery timing determination unit from determining the recovery timing for the predetermined period when the power outage occurrence probability is equal to or higher than a second predetermined value higher than the predetermined value.

The fuel cell power-supply management device may include: a weather information acquisition unit that acquires weather information for an area where the fuel cell power-supply is set; a power outage occurrence probability estimation unit that estimates power outage occurrence probability in the area for a predetermined period ahead based on the weather information; and a boil-off gas recovery condition change unit that prohibits the boil-off gas recovery timing determination unit from determining the recovery timing for the predetermined period when the power outage occurrence probability is equal to or higher than a predetermined value.

A second aspect for achieving the above object is a fuel cell power-supply management method executed by a computer for managing a fuel cell power-supply having a liquid hydrogen tank and a boil-off gas accumulation unit for accumulating boil-off gas generated in the liquid hydrogen tank, the fuel cell power-supply management method including: a boil-off gas accumulation amount recognition step that recognizes an accumulation amount of boil-off gas in the boil-off gas accumulation unit; a demand status recognition step that recognizes a demand status for each use of the boil-off gas; a boil-off gas recovery timing determination step that determines a recovery timing of the boil-off gas accumulated in the boil-off gas accumulation unit, based on an accumulation amount of the boil-off gas or a demand status of the boil-off gas, the accumulation amount being recognized by the boil-off gas accumulation amount recognition step, the demand status being recognized by the demand status recognition step; and a boil-off gas utilization processing arrangement step that arranges utilization processing of the boil-off gas recovered from the boil-off gas accumulation unit at the recovery timing.

Advantageous Effect of Invention

The above fuel cell power-supply management device makes it possible to efficiently recover and utilize boil-off gas.

BRIEF DESCRIPTION OF DRAWINGS

FIG. 4 is a second flowchart of boil-off gas utilization support processing with the fuel cell power-supply management device.

DESCRIPTION OF EMBODIMENTS

1. Aspect of Support for Utilization of Boil-Off Gas with Fuel Cell Power-Supply Management Device With reference to FIGS. 1 and 2, the following describes an aspect of support for utilization of boil-off gas generated by a fuel cell power-supply 50, which support is implemented by a fuel cell power-supply management device 1. Hereinafter, the fuel cell power-supply management device 1 is referred to as an FC (fuel cell) power-supply management device 1, the fuel cell power-supply 50 is referred to as an FC power-supply 50, and the boil-off gas is referred to as BOG.

Figure 2:
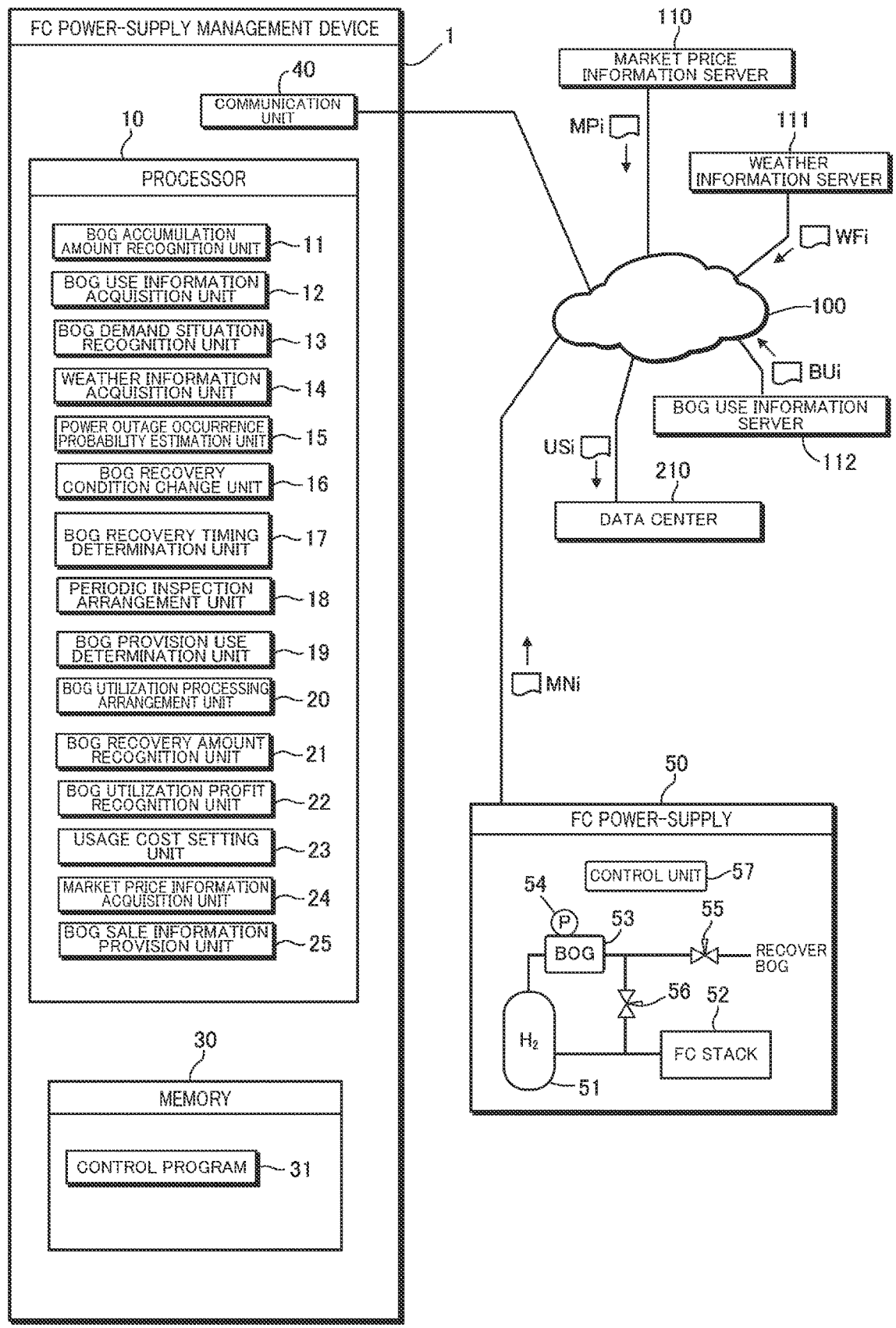
FIG. 2 is an explanatory diagram of a configuration of a fuel cell power-supply management device.

As shown in FIG. 2, the FC power-supply 50 includes a liquid hydrogen tank 51 filled with liquid hydrogen, an FC stack 52 that generates power through redox reaction between the hydrogen supplied from the liquid hydrogen tank 51 and oxygen in the air, and a BOG tank 53 for accumulating BOG generated from the liquid hydrogen tank 51. Furthermore, the FC power-supply 50 includes a BOG pressure sensor 54 for detecting the pressure in the BOG tank 53, a BOG recirculation valve 56 for switching between supply and cutoff of BOG from the BOG tank 53 to the FC stack 52, and a BOG recovery valve 55 for recovering BOG accumulated in the BOG tank 53. The BOG tank 53 and the BOG recovery valve 55 constitute a BOG recovery device of the present disclosure.

Figure 1:
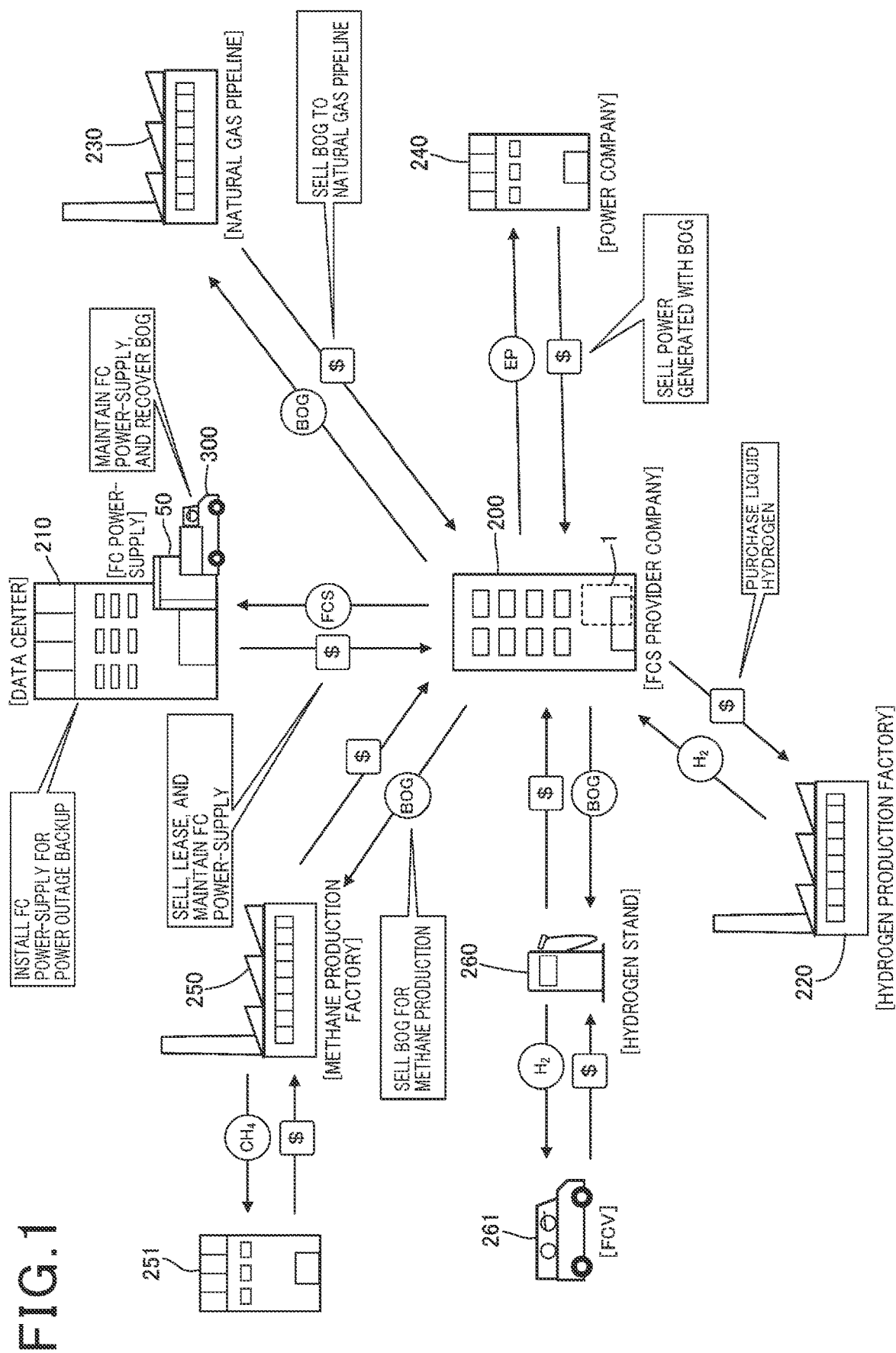
FIG. 1 is an explanatory diagram showing an aspect of supporting utilization of boil-off gas with the fuel cell power-supply management device.

The FC power-supply management device 1 is installed in an FCS (fuel cell system) provider company 200 that sells, leases, and maintains the FC power-supply 50, sells liquid hydrogen, etc. FIG. 1 shows an example in which the FCS provider company 200 purchases liquid hydrogen from a hydrogen production company 220. In addition, FIG. 1 shows a status in which the FCS provider company 200 provides a data center 210 with the FC power-supply 50 by lease and supports the operation of the FC power-supply 50. The data center 210 has an FC power-supply 50 as a backup power-supply in a power outage occurrence.

The FCS provider company 200 implements regular maintenance of the FC power-supply 50 and service of recovering and utilizing the BOG generated in the liquid hydrogen tank 51 of the FC power-supply 50 and accumulated in the BOG tank 53 thereof. The recovery of BOG may be performed by a service vehicle 300, or may be performed by connecting the provision destination and the FC power-supply 50 through piping. The data center 210 pays the FCS provider company 200 the lease fee and maintenance fee for the FC power-supply 50. The FC power-supply management device 1 recovers and utilizes the BOG generated by the FC power-supply 50, thereby executing processing of reducing the usage cost borne by the data center 210 in deploying the FC power-supply 50.

The FCS provider company 200 provides BOG for the following first to seventh uses, thereby obtaining benefits such as reduction in power cost in the data center 210 and gain on the sale of BOG.

First use . . . supplying BOG to the FC stack 52 to generate power and maintaining the FC power-supply 50 using the generated power.

Second use . . . supplying BOG to the FC stack 52 to generate power, and using the generated power to operate the data center 210 equipment.

Third use . . . using BOG for fuel for the FCV (fuel cell vehicle) operated in the data center 210.

Fourth use . . . selling BOG to a natural gas pipeline 230.

Fifth use . . . supplying BOG to the FC stack 52 to generate power, and selling the generated power to a power company 240 (power selling).

Sixth use . . . selling BOG to a methane production company 250. The methane production company 250 reacts the purchased BOG with other substances such as $CO_2$ to produce methane gas and sells it to other production company 251, etc. Here, the substance generated from BOG may be a substance other than methane gas.

Seventh use . . . selling BOG to a stand. The sold BOG is to be sold to FCV 261, etc.

Provision of BOG for the above first to third uses allows a portion of the power used in the data center to be covered by BOG power generation. This makes it possible to reduce the power usage fee to be paid to the power company by the data center 210. Then, the reduced power usage fee can be used for the payment of the usage fee of the FC power-supply 50 (lease fee, maintenance fee, purchase cost of liquid hydrogen, etc.), to reduce the usage cost of the FC power-supply 50, promoting spread of the FC power-supply 50.

Also, when BOG is provided for the fourth to seventh uses, the FC power-supply management device 1 reduces the usage fee of the FC power-supply 50 according to the profit from the sale of the BOG. This makes it possible to reduce the usage cost of the FC power-supply 50 to promote spread of the FC power-supply 50. The FC power-supply management device 1 also executes processing for efficiently recovering BOG and processing for determining an appropriate use for BOG to be provided.

[Configuration of FC Power-Supply Management Device]

A configuration of the FC power-supply management device 1 will be described with reference to FIG. 2. The FC power-supply management device 1 is a computer system including a processor 10, a memory 30, and a communication unit 40. The processor 10 corresponds to a computer of the present disclosure.

The FC power-supply management device 1 causes the communication unit 40 to communicate, via a communication network 100, with a FC power-supply 50, a market price information server 110, a weather information server 111, a BOG use information server 112, and a data center 210. The control unit 57 of the FC power-supply 50 transmits monitor information MNi indicating the operating status of the FC power-supply 50 to the FC power-supply management device 1. The monitor information MNi includes the pressure in the BOG tank 53 detected by the BOG pressure sensor 54 and the provision destination and provision amount of the recovered BOG.

The market price information server 110 transmits, to the FC power-supply management device 1, market price information MPi indicating market prices (transaction prices) of BOG and power when BOG is provided and sold for the fourth to seventh uses. The weather information server 111 transmits, to the FC power-supply management device 1, weather information WFi indicating a weather forecast for a predetermined period ahead. The BOG use information server 112 transmits, to the FC power-supply management device 1, BOG use information BUi indicating the demand status of the first to seventh usages and the consumable amount of BOG in the first to seventh usages. The FC power-supply management device 1 transmits BOG utilization information USi indicating the BOG utilization status to the data center 210.

The processor 10 reads and executes a control program 31 stored in the memory 30 to function as a BOG accumulation amount recognition unit (boil-off gas accumulation amount recognition unit) 11, a BOG use information acquisition unit 12, a BOG demand status recognition unit (demand status recognition unit) 13, a weather information acquisition unit 14, a power outage occurrence probability estimation unit 15, a BOG recovery condition change unit (boil-off gas recovery condition change unit) 16, a BOG recovery timing determination unit (boil-off gas recovery timing determination unit) 17, a periodic inspection arrangement unit 18, a BOG provision use determination unit 19, a BOG utilization processing arrangement unit (boil-off gas utilization processing arrangement unit) 20, a BOG recovery amount recognition unit 21, a BOG utilization profit recognition unit 22, a usage cost setting unit 23, a market price information acquisition unit 24, and a BOG sale information provision unit 25.

The BOG accumulation amount recognition unit 11 receives the monitor information MNi transmitted from the FC power-supply 50, to recognize the internal pressure of the BOG tank 53 detected by the BOG pressure sensor 54. Based on the internal pressure of the BOG tank 53, the BOG accumulation amount recognition unit 11 recognizes the amount of BOG accumulated in the BOG tank 53. Note that the amount of BOG gas accumulated in the BOG tank 53 may be recognized by detecting the flow rate of the BOG gas flowing into the BOG tank 53 from the liquid hydrogen tank 51 instead of the internal pressure of the BOG tank 53.

The BOG use information acquisition unit 12 receives the BOG use information BUi transmitted from the BOG use information server 112, to recognize uses in which BOG can be utilized. In the present embodiment, the BOG use information acquisition unit 12 recognizes the first to seventh uses as uses in which BOG can be utilized. The BOG demand status recognition unit 13 receives the BOG use information BUi transmitted from the BOG use information server 112, to recognize the demand for BOG (amount of BOG needed) in the first to seventh uses above.

The weather information acquisition unit 14 receives weather information WFi transmitted from the weather information server 111, to acquire weather forecast information for a predetermined period (for example, one week) ahead in the predetermined area where the FC power-supply 50 is installed. Based on the information of the weather forecast for the predetermined period ahead acquired by the weather information acquisition unit 14, the power outage occurrence probability estimation unit 15 predicts the occurrence of a lightning strike, etc. and estimates the power outage occurrence probability within the predetermined period ahead in the predetermined area.

Based on the power outage occurrence probability estimated by the power outage occurrence probability estimation unit 15, the BOG recovery condition change unit 16 changes conditions for determining the timing of recovering BOG from the FC power-supply 50. In the present embodiment, the conditions for determining the timing of recovering BOG are set to the following first condition and second condition.

First condition . . . the accumulated amount of BOG gas in the BOG tank 53 is equal to or greater than the first determination amount.

Second condition . . . the BOG demand amount in any of the above first to seventh uses is equal to or greater than the second determination amount. Note that the second condition may be set so that the total BOG demand amount for the first to seventh uses is equal to or greater than the second determination amount.

Then, when the power outage occurrence probability is equal to or lower than the first predetermined value and the possibility of power outage occurrence is low, the BOG recovery condition change unit 16 relaxes the conditions for determining the BOG recovery timing. In other words, the first determination amount under the first condition and the second determination amount under the second condition are decreased. This relaxes the conditions for determining the recovery timing when the power outage occurrence probability is lower than the predetermined value, relative to when the power outage occurrence probability is equal to or higher than the predetermined value. This then makes it possible to actively recover BOG in a period when the power outage occurrence probability is low.

Further, the BOG recovery condition change unit 16 prohibits the determination of the BOG recovery timing when the power outage occurrence probability is equal to or higher than a second predetermined value higher than the first predetermined value and the possibility of power outage occurrence is high. This makes it possible to prohibit recovery of BOG to secure the accumulated amount of BOG when there is a high possibility with which the FC power-supply 50 should be operated due to a power outage occurrence. This thereby makes it possible to use the BOG to cause the FC power-supply 50 to generate power in a power outage occurrence.

The BOG recovery timing determination unit 17 determines the time when the first condition or the second condition is satisfied as the BOG recovery timing. The periodic inspection arrangement unit 18 determines the timing of periodic inspection of the FC power-supply 50 in synchronization with the recovery timing determined by the BOG recovery timing determination unit 17. Based on the market price information MPi, the market price information acquisition unit 24 recognizes the market price for each use of BOG.

The BOG provision use determination unit 19 determines the use for which the BOG is provided based on the demand status for the first to seventh uses recognized by the BOG demand status recognition unit 13 and the market price for each use of BOG recognized by the market price information acquisition unit 24. Here, priority may be set for the type of use, demand status, market price, etc., which are elements for determining the use for which BOG is to be provided, to determine the use for which BOG is to be provided. The BOG utilization processing arrangement unit 20 arranges provision of BOG for the use determined by the BOG provision use determination unit 19.

The BOG recovery amount recognition unit 21 recognizes the recovery amount of BOG recovered from the FC power-supply 50 and the provision destination based on the monitor information MNi. The BOG utilization profit recognition unit 22 recognizes the profit obtained by providing BOG based on the BOG recovery amount and the provision destination recognized by the BOG recovery amount recognition unit 21. The usage cost setting unit 23 reduces the usage fee of the FC power-supply 50 (usage cost of the FC power-supply 50) based on the profit recognized by the BOG utilization profit recognition unit 22.

The BOG sale information provision unit 25 transmits, to the data center 210, BOG utilization information USi (including the BOG sale information of the present disclosure) indicating the amount of BOG provided and the profit obtained from the sale, regarding the uses for which BOG has been provided. The administrator of the data center 210 can recognize the BOG utilization information USi to recognize the utilization status of the BOG, and can recognize that the usage cost of the FC power-supply 50 is reduced by utilizing the BOG.

3. BOG Utilization Support Processing

Figure 3:
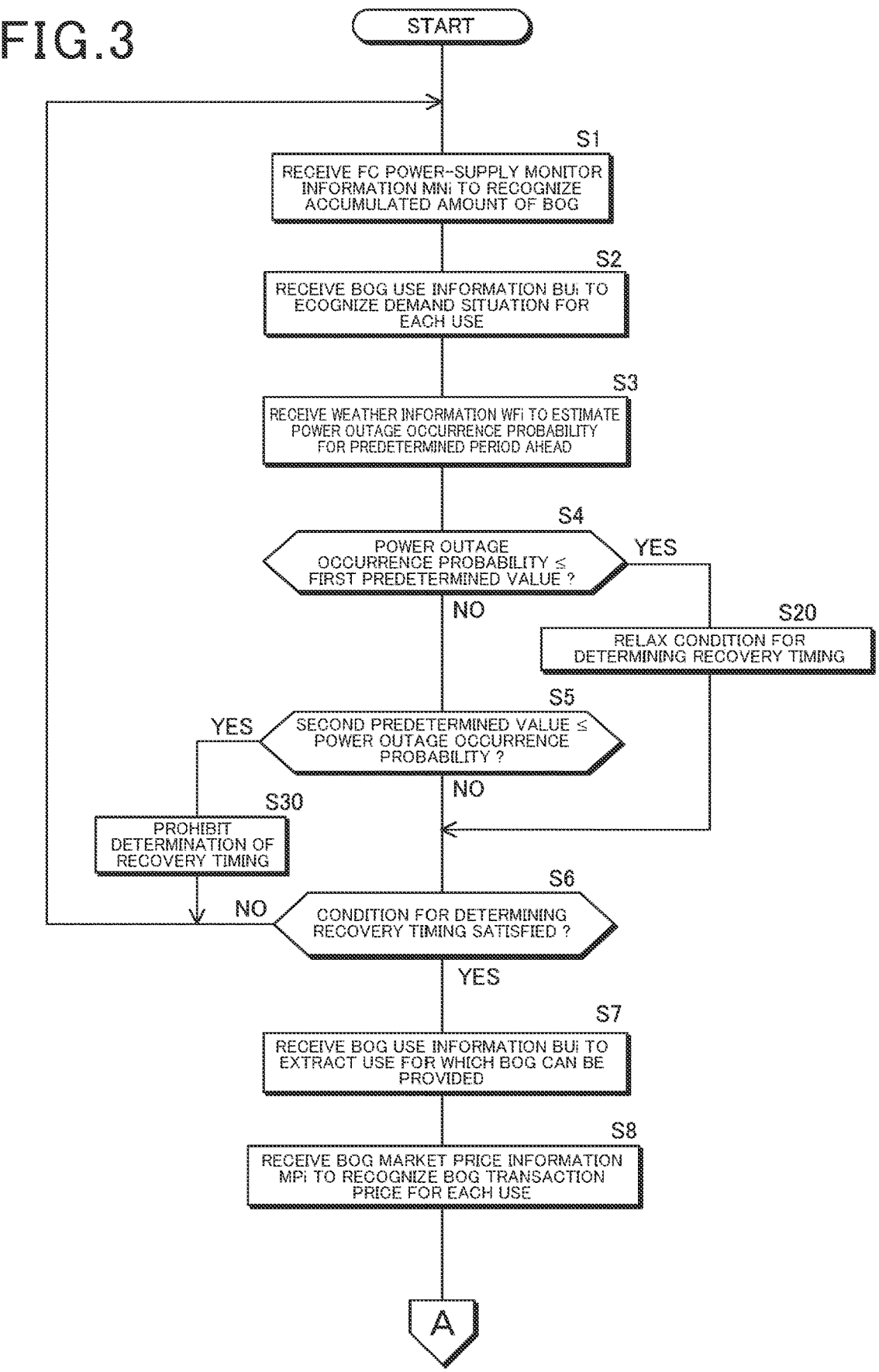
FIG. 3 is a first flowchart of boil-off gas utilization support processing with the fuel cell power-supply management device.

BOG utilization support processing executed by the FC power-supply management device 1 will be described according to flowcharts shown in FIGS. 3 to 4. In step S1 in FIG. 3, the BOG accumulation amount recognition unit 11 recognizes the accumulated amount of BOG in the BOG tank 53 based on the monitor information MNi transmitted from the FC power-supply 50.

In the next step S2, the BOG demand status recognition unit 13 receives the BOG use information BUi transmitted from the BOG use information server 112, and recognizes the demand status of the first to seventh uses based on the BOG use information BUi. In subsequent step S3, the weather information acquisition unit 14 receives the weather information WFi from the weather information server 111, and the power outage occurrence probability estimation unit 15 estimates the power outage probability based on the weather information WFi.

In the next step S4, the BOG recovery condition change unit 16 determines whether the power outage occurrence probability is equal to or lower than the first predetermined value. Then, when the power outage occurrence probability is equal to or lower than the first predetermined value, the BOG recovery condition change unit 16 advances the processing to step S20, and relaxes the conditions for determining the BOG recovery timing as described above, and advances the processing to step S6. Contrarily, when the power outage occurrence probability is higher than the first predetermined value, the BOG recovery condition change unit 16 advances the processing to step S5.

In step S5, the BOG recovery condition change unit 16 determines whether the power outage occurrence probability is equal to or higher than the second predetermined value. Then, when the power outage occurrence probability is equal to or higher than the second predetermined value, the BOG recovery condition change unit 16 advances the processing to step S30 to prohibit determination of the BOG recovery timing, and then advances the processing to step S1. Contrarily, when the power outage occurrence probability is lower than the second predetermined value, the BOG recovery condition change unit 16 advances the processing to step S6.

In step S6, the BOG recovery timing determination unit 17 determines whether a condition for determining the BOG recovery timing is satisfied (whether the first condition or the second condition is satisfied). Then, the BOG recovery timing determination unit 17 advances the processing to step S6 when the condition for determining the BOG recovery timing is satisfied, and advances the processing to step S1 when the condition for determining the BOG recovery timing is not satisfied.

In step S7, the BOG demand status recognition unit 13 receives the BOG use information BUi transmitted from the BOG use information server 112, and recognizes the use for which BOG can be provided based on the BOG use information BUi. In the subsequent step S8, the market price information acquisition unit 24 receives the market price information MPi transmitted from the market price information server 110, and recognizes the transaction price of BOG for each use based on the market price information MPi.

In the next step S9 in FIG. 4, the BOG provision use determination unit 19 determines use with the highest priority, which is set from the BOG demand status and the BOG transaction price among the uses extracted in step S7, to be the use for which BOG is to be provided. In the subsequent step S10, the periodic inspection arrangement unit 18 arranges periodic inspection of the FC power-supply 50, and the BOG utilization processing arrangement unit 20 arranges provision of BOG for the use determined by the BOG provision use determination unit 19. As a result, the BOG can be recovered efficiently in synchronization with periodic inspection of the FC power-supply 50.

In the next step S11, the BOG utilization profit recognition unit 22 determines whether the periodic inspection of the FC power-supply 50 and the provision of BOG are completed, and advances the processing to step S12 when the periodic inspection of the FC power-supply 50 and the provision of BOG are completed. In step S12, the BOG utilization profit recognition unit 22 recognizes the profit obtained by providing the BOG. In the next step S13, the usage cost setting unit 23 reduces the usage fee of the FC power-supply 50 according to the profit obtained by providing the BOG.

4. Other Embodiments

In the above embodiment, the FCS provider company 200 provides the user (data center 210) with the FC power-supply 50 under a lease contract. As another embodiment, the FCS provider company 200 may provide the FC power-supply 50 by selling out. In the case of selling out, the maintenance cost of the FC power-supply 50, etc. becomes the usage cost.

Alternatively, the FCS provider company 200 may sell liquid hydrogen to a user of FC power-supply. In this case, there may be a scheme such that the purchase cost of the liquid hydrogen is determined to be the usage cost of the FC power-supply 50 and the usage cost of the FC power-supply 50 is reduced by discounting the selling price of the liquid hydrogen according to the provision of BOG.

In the above-described embodiment, the first to seventh uses are exemplified as uses for which BOG are utilized, but any use is allowed as long as the provision of BOG provides the user of the FC power-supply 50 with some benefit.

In the above embodiment, an example is shown in which the FC power-supply management device 1 is installed in the FCS provider company 200. However, the FC power-supply management device 1 may be provided in the FC power-supply 50, or may be installed in the data center 210 (deployment location of the FC power-supply 50). Alternatively, the FC power-supply management device 1 may be composed of a server other than the servers of FCS provider company 200 and the data center 210.

Note that FIG. 2 is a schematic diagram showing the configuration of the FC power-supply management device 1 segmented according to the main matters to be processed for facilitating understanding of the invention of the present application, and the FC power-supply management device may also be configured based on other segmentations. The processing of each component may be executed by one hardware unit, or may be executed by a plurality of hardware units. Further, the processing of each component according to the flowcharts shown in FIGS. 3 and 4 may be executed by one program or may be executed by a plurality of programs.

In the above embodiment, the processing executed by the BOG accumulation amount recognition unit 11 corresponds to a boil-off gas accumulation amount recognition step in a fuel cell power-supply management method of the present disclosure, and the processing executed by the BOG demand status recognition unit 13 corresponds to a demand status recognition step in the fuel cell power-supply management method of the present disclosure. In addition, the processing executed by the BOG recovery timing determination unit 17 corresponds to a boil-off gas recovery timing determination step in the fuel cell power-supply management method of the present disclosure, and the processing executed by the BOG utilization processing arrangement unit 20 corresponds to a boil-off gas utilization processing arrangement step of the present disclosure.

5. Configurations Supported by Above Embodiments

The above embodiments are specific examples of the following configurations.

(Configuration 1) A fuel cell power-supply management device that manages a fuel cell power-supply having a liquid hydrogen tank and a boil-off gas accumulation unit for accumulating boil-off gas generated in the liquid hydrogen tank, the fuel cell power-supply management device including: a boil-off gas accumulation amount recognition unit that recognizes an accumulation amount of boil-off gas in the boil-off gas accumulation unit; a demand status recognition unit that recognizes a demand status for each use of the boil-off gas; a boil-off gas recovery timing determination unit that determines a recovery timing of the boil-off gas accumulated in the boil-off gas accumulation unit, based on an accumulation amount of the boil-off gas or a demand status of the boil-off gas, the accumulation amount being recognized by the boil-off gas accumulation amount recognition unit, the demand status being recognized by the demand status recognition unit; and a boil-off gas utilization processing arrangement unit that arranges utilization processing of the boil-off gas recovered from the boil-off gas accumulation unit at the recovery timing.

The fuel cell power-supply management device of configuration 1 makes it possible to efficiently recover and utilize the boil-off gas generated in the liquid hydrogen tank.

(Configuration 2) The fuel cell power-supply management device according to configuration 1, further including a periodic inspection arrangement unit that arranges periodic inspection of the fuel cell power-supply in synchronization with the recovery timing, wherein the boil-off gas utilization processing arrangement unit arranges, as the utilization processing, the periodic inspection in which the power generated by utilizing boil-off gas recovered from the boil-off gas accumulation unit is used.

The fuel cell power-supply management device of configuration 2 makes it possible to perform periodic inspection of the fuel cell power-supply using power generated by utilizing the recovered boil-off gas.

(Configuration 3) The fuel cell power-supply management device according to configuration 1 or 2, further including: a weather information acquisition unit that acquires weather information for an area where the fuel cell power-supply is installed; a power outage occurrence probability estimation unit that estimates power outage occurrence probability in the area for a predetermined period ahead based on the weather information; and a boil-off gas recovery condition change unit that relaxes a condition for determining the recovery timing when the power outage occurrence probability is lower than a predetermined value, relative to when the power outage occurrence probability is equal to or higher than the predetermined value, the condition being determined by the boil-off gas recovery timing determination unit for the predetermined period.

The fuel cell power-supply management device of configuration 3 makes it possible to recover and utilize boil-off gas when it is assumed that there is a low probability of power outage occurrence and a low possibility of increasing the amount of power generated by the fuel cell power-supply using boil-off gas for fuel to be used for power outage.

(Configuration 4) The fuel cell power-supply management device according to configuration 3, wherein the boil-off gas recovery condition change unit prohibits the boil-off gas recovery timing determination unit from determining the recovery timing for the predetermined period when the power outage occurrence probability is equal to or higher than a second predetermined value higher than the predetermined value.

The fuel cell power-supply management device of configuration 4 makes it possible to maintain a state in which boil-off gas, which is to be used for fuel of the fuel cell power-supply in preparation for power outage when the power outage occurrence probability is high, is accumulated in the boil-off gas accumulation unit.

(Configuration 5) The fuel cell power-supply management device according to configuration 1 or 2, further including: a weather information acquisition unit that acquires weather information for an area where the fuel cell power-supply is set; a power outage occurrence probability estimation unit that estimates power outage occurrence probability in the area for a predetermined period ahead based on the weather information; and a boil-off gas recovery condition change unit that prohibits the boil-off gas recovery timing determination unit from determining the recovery timing for the predetermined period when the power outage occurrence probability is equal to or higher than a predetermined value.

The fuel cell power-supply management device of configuration 5 makes it possible to maintain a state in which boil-off gas, which is to be used for fuel of the fuel cell power-supply in preparation for power outage when the power outage occurrence probability is high, is accumulated in the boil-off gas accumulation unit.

(Configuration 6) A fuel cell power-supply management method executed by a computer for managing a fuel cell power-supply having a liquid hydrogen tank and a boil-off gas accumulation unit for accumulating boil-off gas generated in the liquid hydrogen tank, the fuel cell power-supply management method including: a boil-off gas accumulation amount recognition step that recognizes an accumulation amount of boil-off gas in the boil-off gas accumulation unit;

a demand status recognition step that recognizes a demand status for each use of the boil-off gas; a boil-off gas recovery timing determination step that determines a recovery timing of the boil-off gas accumulated in the boil-off gas accumulation unit, based on an accumulation amount of the boil-off gas or a demand status of the boil-off gas, the accumulation amount being recognized by the boil-off gas accumulation amount recognition step, the demand status being recognized by the demand status recognition step; and a boil-off gas utilization processing arrangement step that arranges utilization processing of the boil-off gas recovered from the boil-off gas accumulation unit at the recovery timing.

Execution of the fuel cell power-supply management method of configuration 6 by a computer makes it possible to obtain the same effects as the fuel cell power-supply management device of configuration 1.

INDUSTRIAL APPLICABILITY

The fuel cell power-supply management device and the fuel cell power-supply management method of the present disclosure can be applied to uses in which boil-off gas, which is generated in the liquid hydrogen tank of the fuel cell power-supply, is efficiently recovered and utilized.

REFERENCE SIGNS LIST

1 . . . fuel cell power-supply (FC power-supply) management device, 10 . . . processor, 11 . . . BOG accumulation amount recognition unit, 12 . . . BOG use information acquisition unit, 13 . . . BOG demand status recognition unit, 14 . . . weather information acquisition unit, 15 . . . power outage occurrence probability estimation unit, 16 . . . BOG recovery condition change unit, 17 . . . BOG recovery timing determination unit, 18 . . . periodic inspection arrangement unit, 19 . . . BOG provision use determination unit, 20 . . . BOG utilization processing arrangement unit, 21 . . . BOG recovery amount recognition unit, 22 . . . BOG utilization profit recognition unit, 23 . . . usage cost setting unit, 24 . . . market price information acquisition unit, 25 . . . BOG sale information provision unit, 30 . . . memory, 31 . . . control program, 50 . . . FC power-supply, 51 . . . liquid hydrogen tank, 52 . . . FC stack, 53 . . . BOG tank (boil-off gas accumulation unit), 100 . . . communication network, 110 . . . market price information server, 111 . . . weather information server, 112 . . . BOG use information server.

The invention claimed is:

1. A fuel cell power-supply management device that manages a fuel cell power-supply having a liquid hydrogen tank and a boil-off gas accumulation unit for accumulating boil-off gas generated in the liquid hydrogen tank, the fuel cell power-supply management device comprising:
a boil-off gas accumulation amount recognition unit that recognizes an accumulation amount of boil-off gas in the boil-off gas accumulation unit;
a demand status recognition unit that recognizes a demand status for each use of the boil-off gas;
a boil-off gas recovery timing determination unit that determines a recovery timing of the boil-off gas accumulated in the boil-off gas accumulation unit, based on an accumulation amount of the boil-off gas or a demand status of the boil-off gas, the accumulation amount being recognized by the boil-off gas accumulation amount recognition unit, the demand status being recognized by the demand status recognition unit; and
a boil-off gas utilization processing arrangement unit that arranges utilization processing of the boil-off gas recovered from the boil-off gas accumulation unit at the recovery timing.

2. The fuel cell power-supply management device according to claim 1, further comprising a periodic inspection arrangement unit that arranges periodic inspection of the fuel cell power-supply in synchronization with the recovery timing,
wherein the boil-off gas utilization processing arrangement unit arranges, as the utilization processing, the periodic inspection in which the power generated by utilizing boil-off gas recovered from the boil-off gas accumulation unit is used.

3. The fuel cell power-supply management device according to claim 1, further comprising:
a weather information acquisition unit that acquires weather information for an area where the fuel cell power-supply is installed;
a power outage occurrence probability estimation unit that estimates power outage occurrence probability in the area for a predetermined period ahead based on the weather information; and
a boil-off gas recovery condition change unit that relaxes a condition for determining the recovery timing when the power outage occurrence probability is lower than a predetermined value, relative to when the power outage occurrence probability is equal to or higher than the predetermined value, the condition being determined by the boil-off gas recovery timing determination unit for the predetermined period.

4. The fuel cell power-supply management device according to claim 3, wherein the boil-off gas recovery condition change unit prohibits the boil-off gas recovery timing determination unit from determining the recovery timing for the predetermined period when the power outage occurrence probability is equal to or higher than a second predetermined value higher than the predetermined value.

5. The fuel cell power-supply management device according to claim 1, further comprising:
a weather information acquisition unit that acquires weather information for an area where the fuel cell power-supply is set;
a power outage occurrence probability estimation unit that estimates power outage occurrence probability in the area for a predetermined period ahead based on the weather information; and
a boil-off gas recovery condition change unit that prohibits the boil-off gas recovery timing determination unit from determining the recovery timing for the predetermined period when the power outage occurrence probability is equal to or higher than a predetermined value.

6. The fuel cell power-supply management device according to claim 2, further comprising:
a weather information acquisition unit that acquires weather information for an area where the fuel cell power-supply is installed;
a power outage occurrence probability estimation unit that estimates power outage occurrence probability in the area for a predetermined period ahead based on the weather information; and
a boil-off gas recovery condition change unit that relaxes a condition for determining the recovery timing when the power outage occurrence probability is lower than a predetermined value, relative to when the power outage occurrence probability is equal to or higher than the predetermined value, the condition being determined by the boil-off gas recovery timing determination unit for the predetermined period.

7. The fuel cell power-supply management device according to claim 6, wherein the boil-off gas recovery condition change unit prohibits the boil-off gas recovery timing determination unit from determining the recovery timing for the predetermined period when the power outage occurrence probability is equal to or higher than a second predetermined value higher than the predetermined value.

8. The fuel cell power-supply management device according to claim 2, further comprising:
   a weather information acquisition unit that acquires weather information for an area where the fuel cell power-supply is set;
   a power outage occurrence probability estimation unit that estimates power outage occurrence probability in the area for a predetermined period ahead based on the weather information; and
   a boil-off gas recovery condition change unit that prohibits the boil-off gas recovery timing determination unit from determining the recovery timing for the predetermined period when the power outage occurrence probability is equal to or higher than a predetermined value.

9. A fuel cell power-supply management method executed by a computer for managing a fuel cell power-supply having a liquid hydrogen tank and a boil-off gas accumulation unit for accumulating boil-off gas generated in the liquid hydrogen tank, the fuel cell power-supply management method comprising:
   a boil-off gas accumulation amount recognition step that recognizes an accumulation amount of boil-off gas in the boil-off gas accumulation unit;
   a demand status recognition step that recognizes a demand status for each use of the boil-off gas;
   a boil-off gas recovery timing determination step that determines a recovery timing of the boil-off gas accumulated in the boil-off gas accumulation unit, based on an accumulation amount of the boil-off gas or a demand status of the boil-off gas, the accumulation amount being recognized by the boil-off gas accumulation amount recognition step, the demand status being recognized by the demand status recognition step; and
   a boil-off gas utilization processing arrangement step that arranges utilization processing of the boil-off gas recovered from the boil-off gas accumulation unit at the recovery timing.

* * * * *